(12) United States Patent
Kimura

(10) Patent No.: US 6,885,773 B2
(45) Date of Patent: Apr. 26, 2005

(54) METHOD OF DETECTING A FADE CHANGE IN IMAGE INFORMATION BASED ON INTRA-FIELD DISPERSION VALUES AND INTRA-FIELD DC LEVELS

(75) Inventor: Tomohiro Kimura, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 639 days.

(21) Appl. No.: 09/824,717

(22) Filed: Apr. 4, 2001

(65) Prior Publication Data

US 2001/0026641 A1 Oct. 4, 2001

(30) Foreign Application Priority Data

Apr. 4, 2000 (JP) ..................................... P2000-102188

(51) Int. Cl.[7] .............................................. G06K 9/36
(52) U.S. Cl. ..................................... 382/239; 382/236
(58) Field of Search ................................ 382/162, 165, 382/166, 199, 232, 236, 238, 239; 375/240.02, 240.13; 348/595

(56) References Cited

U.S. PATENT DOCUMENTS

| | | | |
|---|---|---|---|
| 5,872,598 A | 2/1999 | Legall et al. | ............... 348/405 |
| 5,959,697 A | 9/1999 | Coleman, Jr. | ............... 348/700 |
| 6,040,861 A | 3/2000 | Boroczky et al. | ........... 348/409 |

FOREIGN PATENT DOCUMENTS

| | | | | |
|---|---|---|---|---|
| EP | 0 637 027 A2 | 2/1995 | ........... | G11B/27/28 |
| JP | 6-22304 | 1/1994 | .......... | H04N/7/137 |

OTHER PUBLICATIONS

Fernando et al., Fade and Dissolve Detection in Uncompressed and Compressed Video Sequences, Oct. 24, 1999—Oct. 28, 1999, Image Processing, 1999. ICIP 99. Proceedings. 1999 International Conference on, IEEE; vol. 3, pp. 299 303.*

Gu et al., "Dissolve Detection in MPEG Compressed Video", IEEE International Conference on Intelligent Processing Systems, Oct. 28–31, 1997, pp. 1692–1696.

* cited by examiner

*Primary Examiner*—Yon J. Couso
(74) *Attorney, Agent, or Firm*—Morgan Lewis & Bockius LLP

(57) ABSTRACT

There are provided an intra-field dispersion value detecting portion for detecting each of the intra-field dispersion values in each field image; an intra-field average DC level detecting portion for detecting each of the intra-field average DC levels in each field image; and a host CPU for detecting the presence or absence of an occurrence of a fade change based on a change of the detected intra-field dispersion value and a change of the detected intra-field average DC level. In this manner, there can be provided an image change detecting apparatus capable of precisely detecting a fade change contained in image information to be encoded upon encoding using an MPEG system.

20 Claims, 6 Drawing Sheets

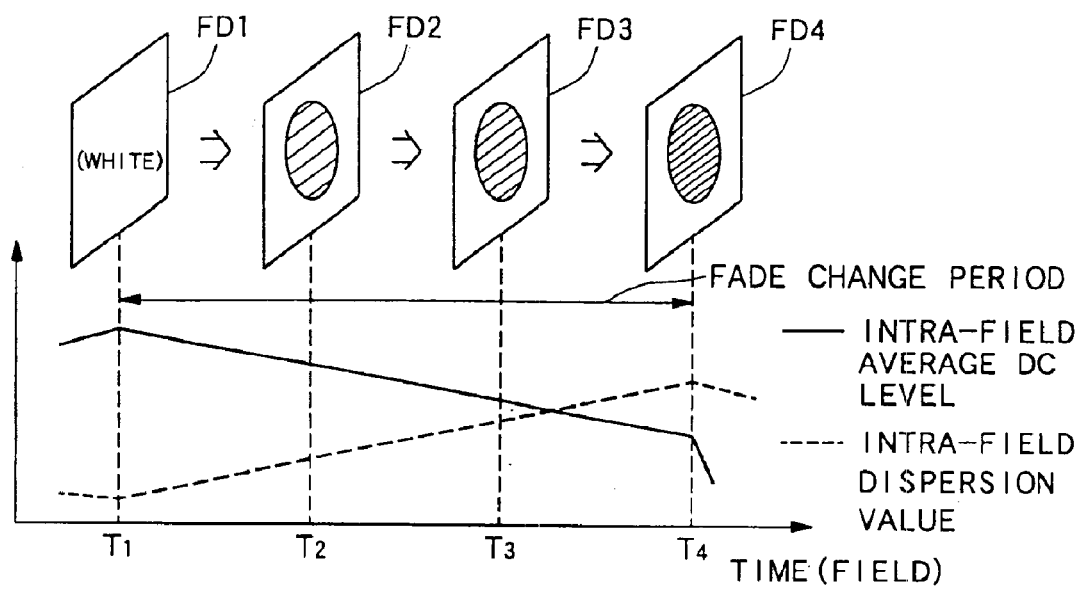
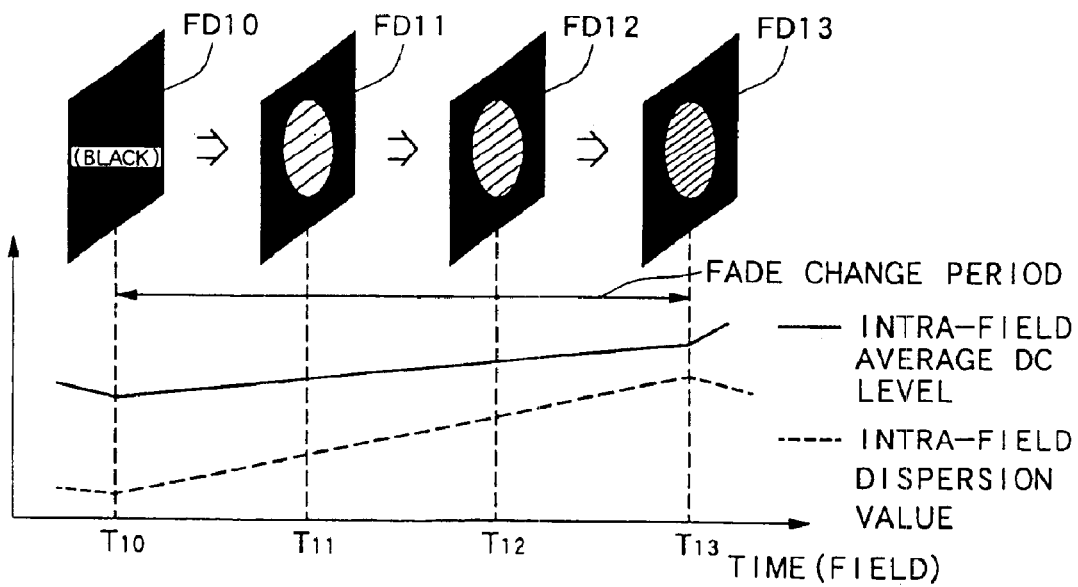

S: ENCODING APPARATUS

METHOD OF DETECTING A FADE CHANGE IN IMAGE INFORMATION BASED ON INTRA-FIELD DISPERSION VALUES AND INTRA-FIELD DC LEVELS

BACKGROUND OF THE INVENTION

1. Field of the Invention

The present invention relates to a technical field of an image change detecting apparatus, an image change detecting method, an image encoding apparatus, and an information recording medium having an image change detecting program recorded in a computer readable manner. More particularly, the present invention relates to a technical field of the image change detecting apparatus and method for detecting whether or not a fade change occurs, in which an image constituent element continuously changes so that it gradually appears from a field image composed of a single color up to a field image containing any image constituent element among a plurality of continuous field images in image information. Further, the present invention relates to the image encoding apparatus containing the same and the information recording medium having the program recorded in a computer readable manner for detecting the above-mentioned image change.

2. Description of the Related Art

In general, in the case of encoding (including compression encoding) image information having a plurality of continuous frame images composed of two or more field images, it is required to optimally control an encoding parameter according to characteristics of the image information.

An MPEG (Moving Picture Experts Group) system is generally known as the above encoding system recently.

This MPEG system is a kind of encoding processing using a discrete cosine transform (DCT) system. In recent years, the MPEG system is defined as an international standard for a system of encoding image information (including both of moving image information and static image information) with high efficiency, that is, for a compression encoding system.

In image compression encoding using the MPEG system, generally, an original image to be compressed and encoded is divided into a block called macro-block as pixel block. The macro-block includes 16×16 pixels out of the original image composed of a plurality of pixels. Then, motion compensation and the DCT, or encoding processing are executed in unit of the macro block.

On the other hand, the image information to be encoded may include fade change in which any image constituent element continuously changes so that it gradually appears from a field image composed of a single color (any color is acceptable.) up to a field image including any image constituent element among a plurality of continuous field images. For example, the fade change denotes a change that a cloud gradually appears in the sky. In this case, the fade change is called "fade-in".

If an occurrence of the fade change is detected, it is required to set the parameter after the occurrence so that the parameter is suitable to a field image after any image constituent element appeared. In the case where the field image is encoded after any image constituent element appeared by using the parameter suitable for a field image composed of a single color without setting the parameter as mentioned above, there occurs a failure such as interfusion of a variety of noises in the image reproduced for a predetermined period immediately after fade change occurred when the encoded image information is decoded and reproduced.

However, in a conventional MPEG system, the above described fade change is not detected.

Therefore, in image encoding using the conventional MPEG system, there has been a problem that a variety of noises are interfused in the decoded image after the fade change occurred.

SUMMARY OF THE INVENTION

The present invention has been made in view of the foregoing problems. It is an object of the present invention to provide an image change detecting apparatus, an image change detecting method, an image encoding apparatus containing the same, and an information recording medium having the image change detecting program recorded in a computer readable manner, capable of precisely detecting the fade change contained in image information to be encoded upon encoding using the MPEG system.

The above object of the present invention can be achieved by an image change detecting apparatus for detecting generation of a fade change in image information containing a plurality of field images in accordance with the present invention. The image change detecting apparatus is provided with: a dispersion value detecting device for detecting each of intra-field dispersion value in each field image; an average direct current level detecting device for detecting each of intra-field average direct current levels in each field image; and a detecting device for detecting whether or not the fade change occurs based on a change of the detected intra-field dispersion value and a change of the detected intra-field average direct current level.

According to the image change detecting apparatus, the dispersion value detecting device detects each of intra-field dispersion value in each field image. Then, the average direct current level detecting device detects each of intra-field average direct current levels in each field image. Further, the detecting device detects whether or not the fade change occurs based on a change of the detected intra-field dispersion value and a change of the detected intra-field average direct current level.

Therefore, the presence or absence of the fade change is detected based on a change of the intra-field dispersion value and a change of the intra-field average direct current (DC) level in continuous field images, and thus, the fade change contained in image information can be detected precisely As a result, an image processing such as changing an encoding parameter at a timing of the fade change and performing encoding can be performed.

In one aspect of the image change detecting apparatus of the present invention, the detecting device detects that the fade change occurs in the plurality of the continuous field images when the detected intra-field dispersion value and the detected intra-field average direct current level change linearly altogether relevant to a plurality of the continuous field images.

According to this aspect, the fade change can be detected more precisely.

In another aspect of the image change detecting apparatus of the present invention, the detecting device detects that the fade change from the field images of single white color occurs in the plurality of the continuous field images when the detected intra-field dispersion value has a positive gradient and changes linearly, and when the detected intra-field average direct current level has a negative gradient and changes linearly, relevant to the plurality of the continuous field images.

According to this aspect, the fade change from a field image of a single white color can be detected more precisely.

In another aspect of the image change detecting apparatus of the present invention, the detecting device detects that the fade change from the field images of single black color occurs in the plurality of the continuous field images relevant to the plurality of the continuous field images when the detected intra-field dispersion value and the detected intra-field average direct current level each have a positive gradient and changes linearly.

According to this aspect, the fade change from a field image of a single black color can be detected more precisely.

The above object of the present invention can be achieved by an image encoding apparatus including an image change detecting apparatus for detecting generation of a fade change in image information containing a plurality of field images in accordance with the present invention. The image change detecting apparatus included in the image encoding apparatus is provided with: a dispersion value detecting device for detecting each of intra-field dispersion value in each field image; an average direct current level detecting device for detecting each of intra-field average direct current levels in each field image; and a detecting device for detecting whether or not the fade change occurs based on a change of the detected intra-field dispersion value and a change of the detected intra-field average direct current level. The image encoding apparatus is further provided with an encoding device for changing an encoding parameter in encoding of the detected subsequent image information, thereby encoding the image, when it is detected that the fade change occurs.

According to the image encoding apparatus of the present invention, the dispersion value detecting device detects each of intra-field dispersion value in each field image, Then, the average direct current level detecting device detects each of intra-field average direct current levels in each field image. Further, the detecting device detects whether or not the fade change occurs based on a change of the detected intra-field dispersion value and a change of the detected intra-field average direct current level. Then, the encoding device changes the encoding parameter in encoding of the detected subsequent image information, thereby encoding the image, when it is detected that the fade change occurs.

Therefore, the fade change is detected precisely, and the encoding parameter is changed at a timing of the fade change, whereby noise can be reduced, and image information can be encoded more precisely.

In one aspect of the image encoding apparatus of the present invention, the detecting device detects that the fade change occurs in the plurality of the continuous field images when the detected intra-field dispersion value and the detected intra-field average direct current level change linearly altogether relevant to a plurality of the continuous field images.

According to this aspect, the fade change can be detected more precisely and image information can be encoded more precisely.

In another aspect of the image encoding apparatus of the present invention, the detecting device detects that the fade change from the field images of single white color occurs in the plurality of the continuous field images when the detected intra-field dispersion value has a positive gradient and changes linearly, and when the detected intra-field average direct current level has a negative gradient and changes linearly, relevant to the plurality of the continuous field images.

According to this aspect, the fade change from a field image of a single white color can be detected more precisely and image information can be encoded more precisely.

In another aspect of the image encoding apparatus of the present invention, the detecting device detects that the fade change from the field images of single black color occurs in the plurality of the continuous field images relevant to the plurality of the continuous field images when the detected intra-field dispersion value and the detected intra-field average direct current level each have a positive gradient and changes linearly.

According to this aspect, the fade change from a field image of a single black color can be detected more precisely and image information can be encoded more precisely.

The above object of the present invention can be achieved by an image change detecting method for detecting an occurrence of a fade change in image information containing a plurality of field images in accordance with the present invention. The image change detecting method is provided with the processes of: detecting each of the intra-field dispersion values in the each field image; detecting each of the intra-field average direct current level in each field image; and detecting an occurrence of the fade change based on a change of the detected intra-field dispersion value and a change of the detected intra-field average direct current level.

According to the image change detecting method of the present invention, each of the intra-field dispersion values is detected in the each field image, Then, each of the intra-field average direct current level is detected in each field image. Further, the occurrence of the fade change is detected based on a change of the detected intra-field dispersion value and a change of the detected intra-field average direct current level.

Therefore, the presence or absence of the fade change can be detected based on a change of the intra-field dispersion value and a change of the intra-field average DC level in continuous field images, and thus, the fade change contained in image information can be detected precisely. As a result, the fade change in image information is detected precisely, whereby an image processing such as changing an encoding parameter at a timing of the fade change, and performing encoding can be performed.

In one aspect of the image change detecting method of the present invention, the process of detecting each of the intra-field dispersion values detects that the fade change occurs in a plurality of the continuous field images when the detected intra-field dispersion value and the detected intra-field average direct current level change linearly relevant to the plurality of the continuous field images.

According to this aspect, the fade change can be detected more precisely.

The above object of the present invention can be achieved by an information recording medium in which an image change detecting program is readably recorded by a computer included in a image change detecting apparatus for detecting generation of a fade change in image information containing a plurality of field images in accordance with the present invention. The image change detecting program causing the computer to function as; a dispersion value detecting device for detecting each of the intra-field dispersion values in each field image; an average direct current level detecting device for detecting each of the intra-field average direct current levels in each field image; and a detecting device for detecting an occurrence of the fade change based on a change of the detected intra-field dispersion value and a change of the detected intra-field average direct current level.

According to the information recording medium of the present invention, when the image change detecting program is read by the computer, each of the intra-field dispersion values is detected in the each field image. Then, each of the intra-field average direct current level is detected in each field image. Further, the occurrence of the fade change is detected based on a change of the detected intra-field dispersion value and a change of the detected intra-field average direct current level.

Therefore, the presence of absence of the fade change can be detected based on a change of the intra-field dispersion value and a change of the intra-field average DC level in continuous field images, and thus, the fade change contained in image information can be detected precisely. As a result, the fade change in the image information is detected precisely, whereby an image processing such as changing an encoding parameter at a timing of the fade change, thereby performing encoding can be performed.

In one aspect of the information recording medium of the present invention, the image change detecting program causing the computer to further function as the detecting device detects that the fade change occurs in the plurality of continuous field images when the detected intra-field dispersion value and the detected intra-field average direct current level change linearly altogether relevant to a plurality of the continuous field images.

According to this aspect, the fade change can be detected more precisely.

BRIEF DESCRIPTION OF THE DRAWINGS

FIG. 1A is a graph showing a change of an intra-field average DC level and an intra-field dispersion value when there occurs a fade change from a field image of a single white color;

FIG. 1B is a graph showing a change of an intra-field average DC level and an intra-field dispersion value when there occurs a fade change from a field image of a single black color;

DESCRIPTION OF THE PREFERRED EMBODIMENTS

Figure 2:
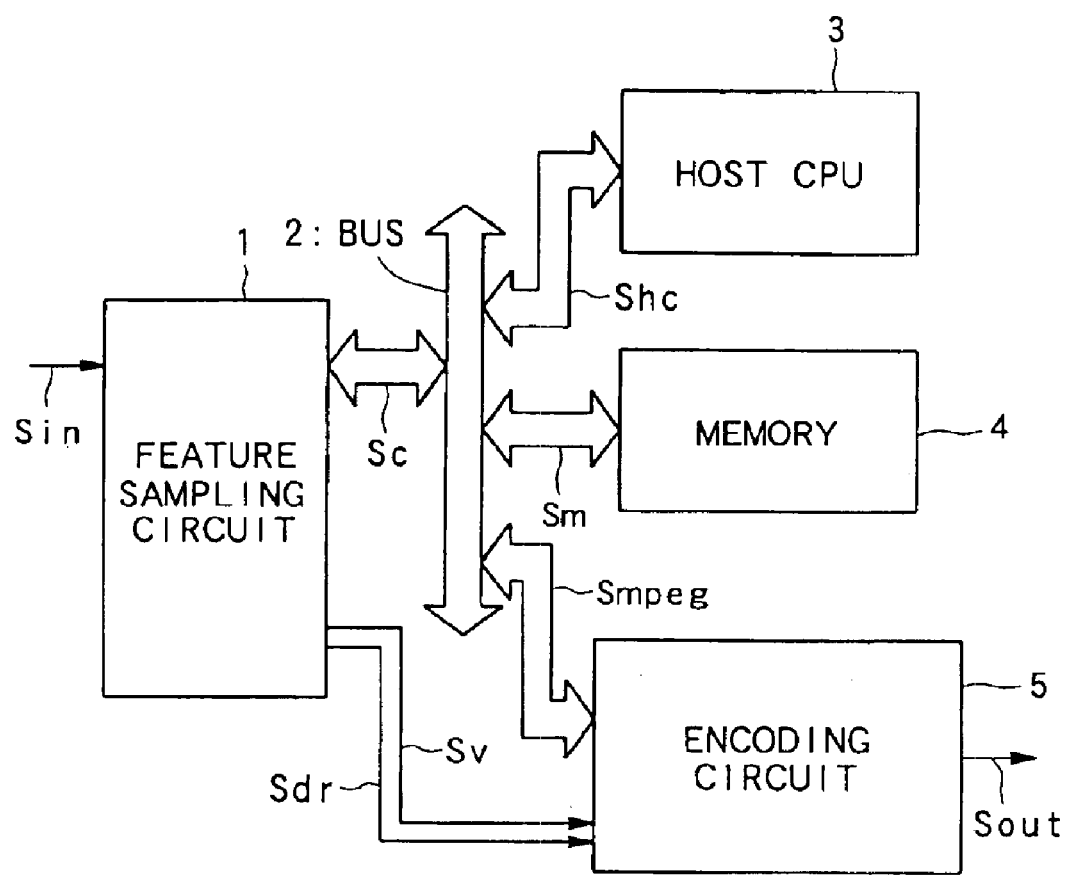
FIG. 2 is a block diagram showing a general configuration of an encoding apparatus according to an embodiment of the present invention.

Next, preferred embodiments of the present invention will be described with reference to the accompanying drawings. The embodiments described below are in case where the present invention is applied to detection of a fade change in an encoding apparatus for encoding by using MPEG system.

(I) Principle of the Present Invention

Before specifically describing preferred embodiments of the present invention, a principle of the present invention will be described with reference to FIG. 1.

FIG. 1A and FIG. 1B are graphs each showing a change of an intra-field dispersion value and a change of an intra-field average DC level when the fade change occurs in image information to be encoded such that a change of a parameter in MPEG system encoding processing (hereinafter, referred to as encoding parameter) occurs. FIG. 1A shows each change when there occurs the fade change from a field image of a single white color, and FIG. 1B shows each change when there occurs the fade change from a field image of a single black color.

The intra-field dispersion value used here denotes a difference between luminance in each pixel contained in each of two field images configuring one frame image and an average value of the luminance in one field image. In other words, this value denotes a value indicating how much scatter (dispersion) in luminance occurs in each pixel in one field image. When the intra-field dispersion value in a field image is high, there is full of variety in the field image relevant to luminance. When the intra-field dispersion value in a field image is low, it is apparent that the field image is a monotonous one with poor variation.

The intra-field DC level denotes an average value of the luminance in each pixel contained one field image.

A change of an infra-field dispersion value and a change of an intra-field average DC level in a case in which there occurs the fade change from a field image of a single white color will be explained with reference to FIG. 1A. When the fade change occurs, and there are gradually changed the contents of a field image from a field image FD1 of the single white color to a field image FD4 containing an image constituent element (filled circle in FIG. 1A), it is found that the intra-field dispersion value shows a change of a substantially monotonous increase as indicated by dashed line shown in FIG. 1A.

On the other hand, in the case where a field image changes from the field image FD1 to the field image FD4, it is found that the intra-field average DC level shows a change of a substantially monotonous decrease as indicated by solid line shown in FIG. 1A.

Next, a change of the intra-field dispersion value and a change of the intra-field average DC level in a case in which there occurs the fade change from a field image of a single black color will be explained with reference to FIG. 1B. When the fade change occurs, and there are gradually changed the contents of field image from a field image FD10 of a single black color to a field image FD13 containing an image constituent element (an open circle in FIG. 1B), it is found that the intra-field dispersion value shows a change of a substantially monotonous increase indicated by dashed line shown in FIG. 1B.

On the other hand, in the case where a field image changes from the field image FD10 to the field image FD13, it is found that the intra-field average DC level shows a change of a substantially monotonous increase indicated by solid line shown in FIG. 1B in the same manner as the intra-field dispersion value.

In the present invention, a change of the intra-field average DC level and a change of the intra-field dispersion value are monitored respectively with respect to a field image corresponding to each of at least three continuous frame images, which is first field image in each of the continuous frame images or second field image in each of the frame images. When both of them change monotonously linearly as well as the intra-field average DC level decreases monotonously and the intra-field dispersion value increases monotonously, it is determined that the fade change (fade-in) from a single white color occurs during a period when they change monotonously linearly, which is a period from time $T_1$ to time $T_4$ shown in FIG. 1A.

On the other hand, when a change of the intra-field DC level and a change of the intra-field dispersion value change monotonously linearly with respect to a field image that corresponds to each of at least three continuous frame images, and the intra-field average DC level and the intra-field dispersion value increases monotonously, it is determined that the fade change (fade-in) from a field image of a single black color occurs during a period when they change monotonously linearly, which is a period from time $T_{10}$ to time $T_{13}$ in FIG. 1B.

After it is detected that the fade change in each case has occurred, an encoding parameter following the first frame image that comes immediately after the fade change occurred is optimized to each value that corresponds to each fade change.

In each of the cases shown in FIG. 1A and FIG. 1B, during a period other than a period when a fade change occurs, the intra-field average DC level and infra-field dispersion value do not show a linear change, either.

(II) Embodiments

Next, preferred embodiments according to the present invention will be specifically described with reference to FIG. 2 to FIG. 6.

Figure 3:
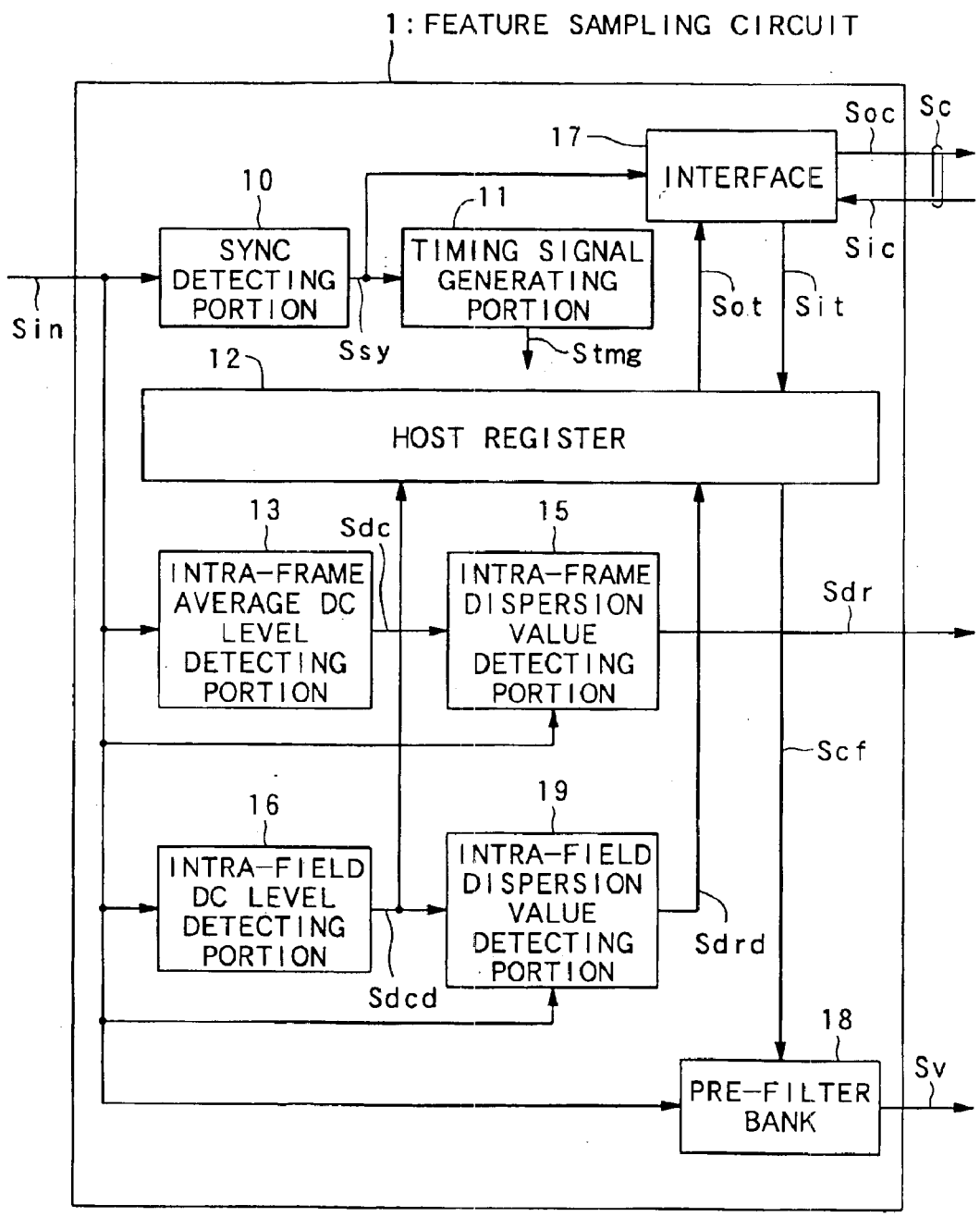
FIG. 3 is a block diagram showing a general configuration of a feature extracting circuit according to the embodiment of the present invention.
Figure 4:
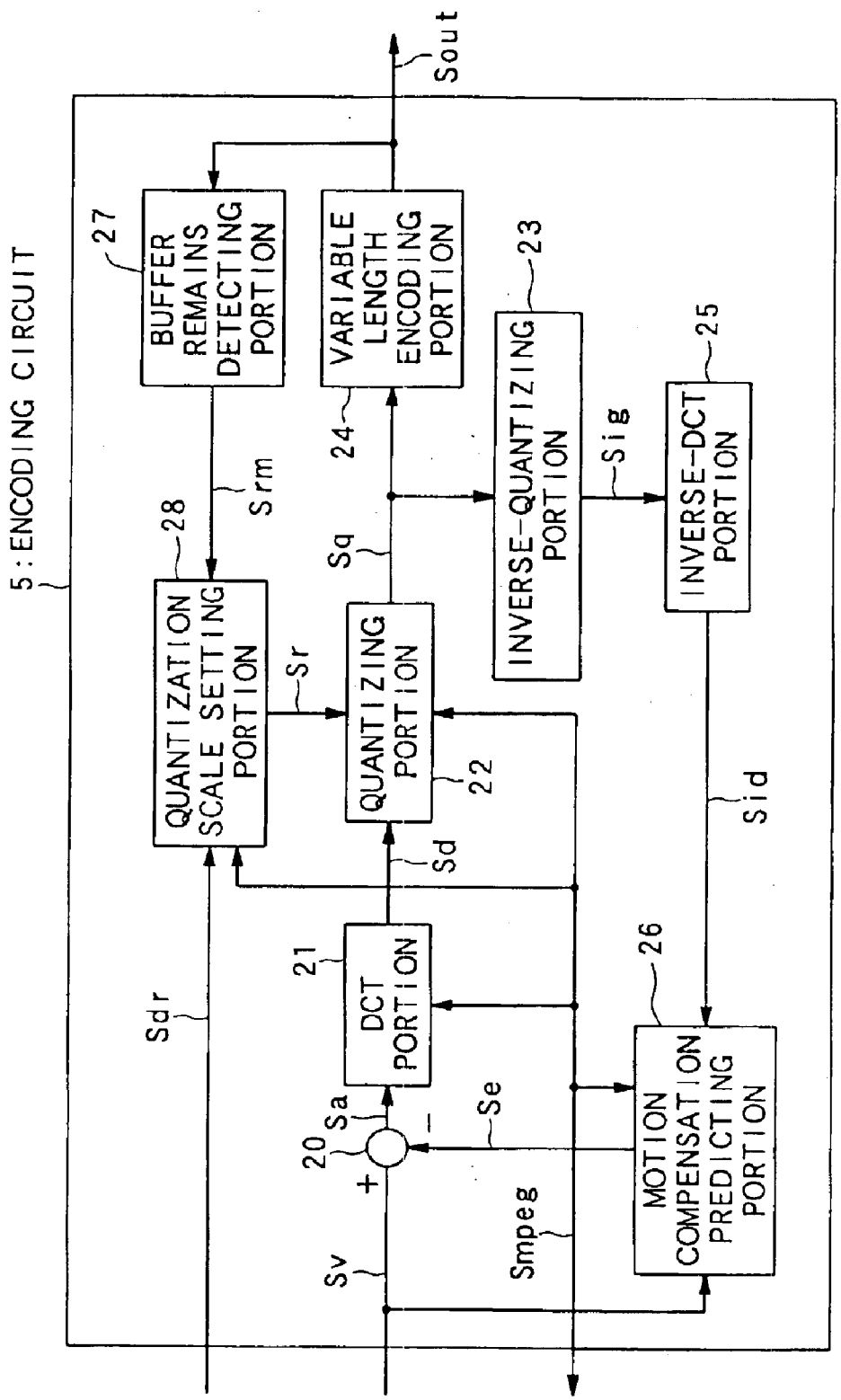
FIG. 4 is a block diagram showing a general configuration of an encoding circuit according to the embodiment of the present invention.
Figure 5:
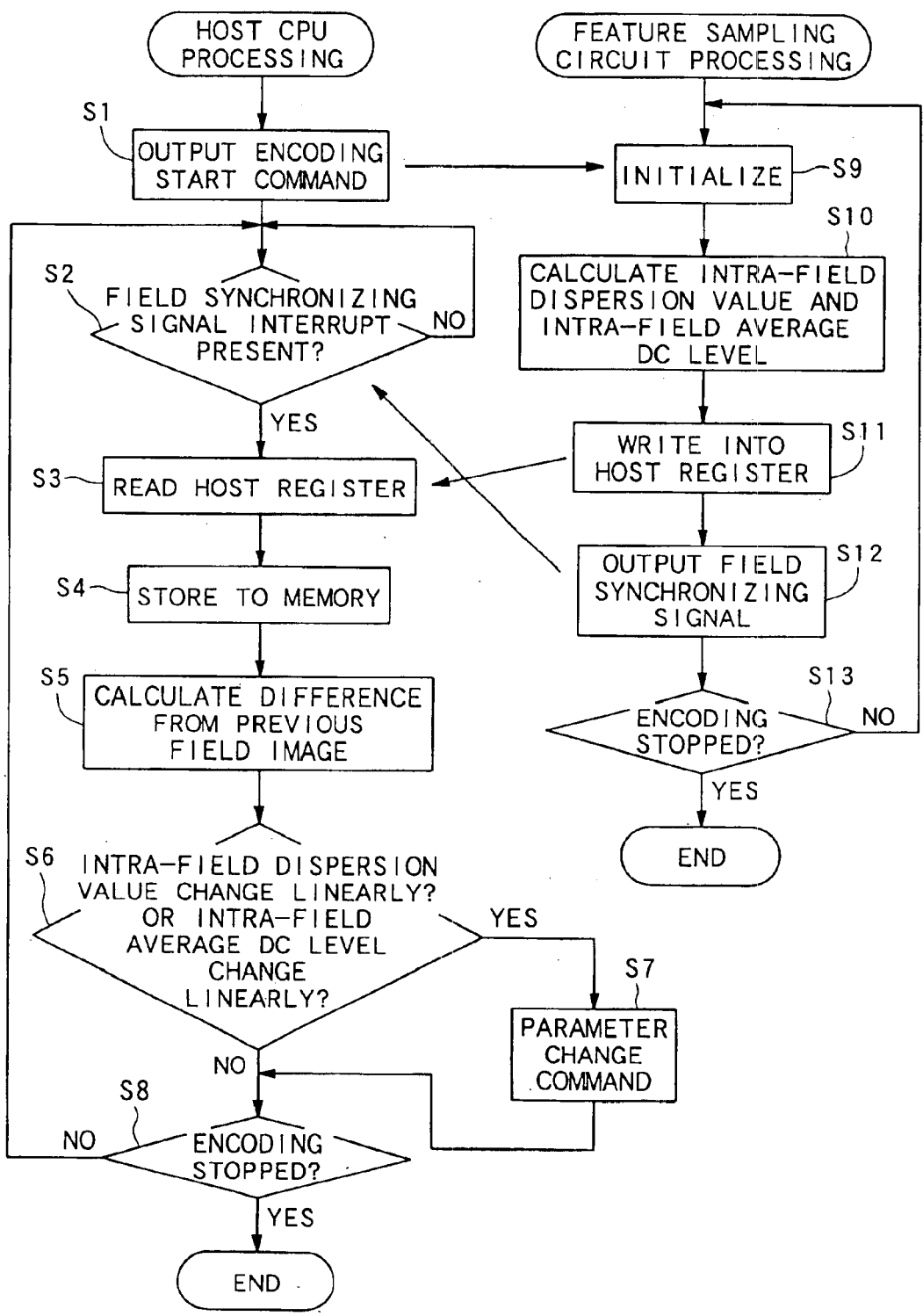
FIG. 5 is a flow chart showing an encoding processing according to the embodiment of the present invention.
Figure 6:
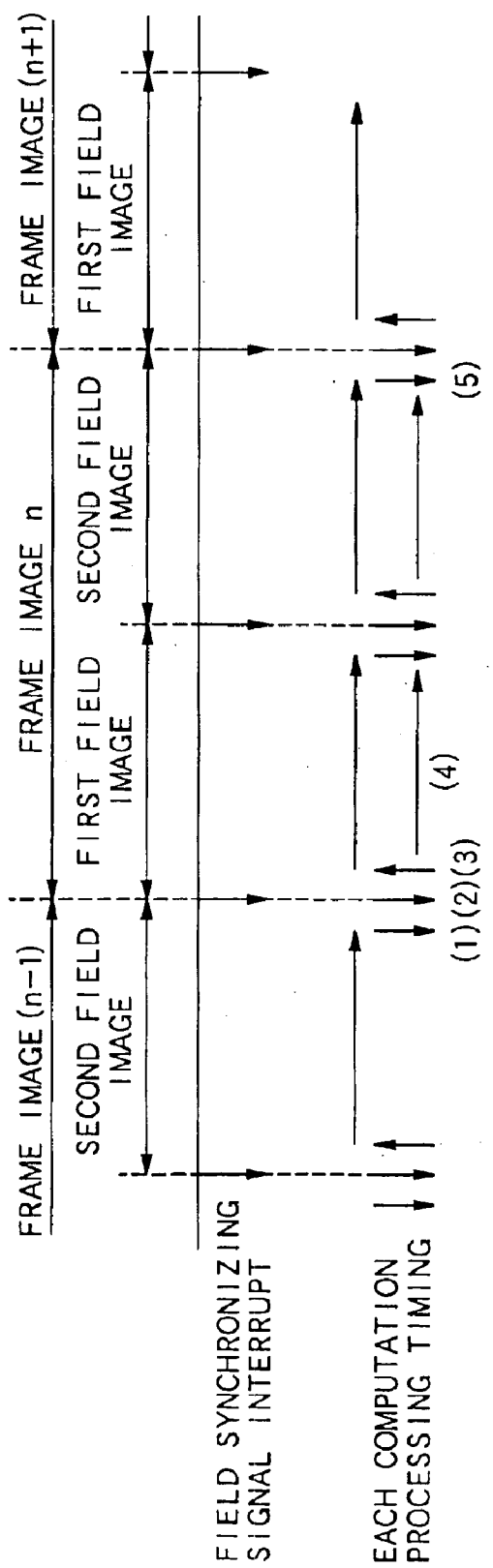
FIG. 6 is a timing chart showing an encoding processing according to the embodiment of the present invention.

FIG. 2 is a block diagram showing a general configuration of an encoding apparatus according to one embodiment of the present invention. FIG. 3 is a block diagram showing a general configuration of a feature extracting circuit according to the one embodiment. FIG. 4 is a block diagram showing a general configuration of the encoding circuit according to the one embodiment. FIG. 5 is a flow chart showing the encoding processing according to the one embodiment. FIG. 6 is a timing chart showing the encoding processing according to the one embodiment.

First, an entire configuration and operation of the encoding apparatus according to one embodiment will be described with reference to FIG. 2.

As shown in FIG. 2, the encoding apparatus S in the embodiment is composed of; a feature extracting circuit 1; a bus 2; a host CPU 3 serving as a detecting device and a computer; a memory 4; and an encoding circuit 5 serving as an encoding device.

Next, a general description of operation will be given here.

The feature extracting circuit 1 receives control information Sc from the host CPU 3 via the bus 2 and sends the control information Sc to the host CPU 3 via the bus 2. The feature extracting circuit 1 also detects each of the intra-field dispersion value and intra-field average DC level in each field image configuring each frame image contained in image information Sin to be encoded, which is externally inputted.

In parallel to this operation, the feature extracting circuit 1 outputs an intra-frame dispersion value described later in each of the frame images as a dispersion value signal Sdr to the encoding circuit 5. In addition, the feature extracting circuit 1 provides the image information Sin with filtering processing optimal to an encoding processing in the encoding circuit 5, and produces an image filter signal Sv to outputs it to the encoding circuit 5.

In this manner, the encoding circuit 5 receives a control signal Smpeg from the host CPU 3 via the bus 2 and sends the control signal Smpeg to the host CPU 3 via the bus 2. In addition, the encoding circuit 5 encodes an image contained in the image filter signal Sv by using the above dispersion value signal Sdr to output the encoded image as an output signal Sout to the external.

The outputted output signal Sout is then subjected to a modulation processing for optical disk recording or broadcasting, for example.

In these processes, the host CPU 3 integrally control a series of the above described encoding processes while the CPU 3 receives a control signal Shc from the other constituent elements via the bus 2 and sends the control signal Shc to the other constituent element via the bus 2.

At this time, the intra-field dispersion value and intra-field average DC level in each field image contained in the control signal Sc from the above feature extracting circuit 1 are outputted as the control signal Shc to the host CPU 3. Based on this outputted signal, the host CPU 3 detects whether or not the above fade change (fade-in) occurs in the image information Sin. The host CPU 3 controls the encoding parameter in the encoding circuit 5 and a passing bandwidth of the above filtering processing in the feature extracting circuit 1 so as to change them on the basis of the detection result.

Together with the above integration control, the host CPU 3 temporarily stores required information in the memory 4 while the CPU 3 receives and sends a memory signal Sm from and to the memory 4 via the bus 2 whenever necessary.

Next, a detailed configuration and operation of the feature extracting circuit 1 will be described with reference to FIG. 3.

As shown in FIG. 3, the embodied feature extracting circuit 1 is composed of: a sync detecting portion 10; a timing signal generating portion 11; a host register 12; an intra-frame average DC level detecting portion 13; an intra-frame dispersion value detecting portion 15; an intra-field average DC level detecting portion 16 serving as an average DC level detecting device; an interface 17; a pre-filter bank 18; and an intra-field dispersion value detecting portion 19 serving as a dispersion value detecting device.

Next, an operation will be described here.

First, the image information Sin inputted to the feature extracting circuit 1 is outputted to each of the sync detecting portion 10, intra-frame average DC level detecting portion 13, intra-field average DC level detecting portion 16, and a pre-filter bank 18.

In this manner, the sync detecting portion 10 detects a synchronizing signal relevant to a field image in image information Sin, and outputs the detected signal as a field synchronizing signal Ssy to the host CPU 3 via the interface 17 and bus 2 at a timing described later. The sync detecting portion 10 also outputs it to the timing signal generating portion 11.

Then, the timing signal generating portion 11 generates a timing signal Stmg that is a reference of operation of each constituent element configuring the feature extracting circuit 1 based on the field synchronizing signal Ssy, and outputs the signal to each of the constituent elements.

On the other hand, the intra-frame average DC level detecting portion 13 to which image information Sin is inputted detects an average value (that is, infra-frame average DC level) of the luminance in each pixel contained in one frame image in the entirety in the one frame image per each frame image in the image information Sin, and outputs the detected value as an average value signal Sdc to the intra-frame dispersion value detecting portion 15.

In this manner, the intra-frame dispersion value detecting portion 15 detects a difference in average value between the luminance in each pixel contained in one frame image and the luminance contained in an average value signal Sdc by using the average value signal Sdc and image information Sin, thereby detecting the intra-frame dispersion value per each frame image. Then, this detecting portion 15 outputs the detected value as the above dispersion value signal Sdr to the encoding circuit 5.

On the other hand, the intra-field DC level detecting portion 16 to which the image information Sin is inputted detects the intra-field average DC level per each field image in the image information Sin. Then, the detecting portion 16 outputs the detected level as an average value signal Sdcd to the host register 12 and intra-field dispersion value detecting portion 19.

In this manner, the intra-field dispersion value detecting portion 19 detects a difference in average value between the luminance in each pixel contained in one field image and the luminance contained in the average value signal Sdc by using the average value signal Sdcd and image information Sin, thereby detecting the intra-field dispersion value per each field image. Then, the detecting portion 19 outputs the detected value as a dispersion value signal Sdrd to the host register 12 at a timing described later.

Then, the host register 12 temporarily stores each of the intra-field average DC level contained in the average value signal Sdcd and the intra-field dispersion value contained in the dispersion value signal Sdrd. Then, the host register 12 outputs the temporarily stored value as a register output signal Sot to the interface 17 at a timing described later.

In this manner, the interface 17 provides predetermined interface processing to the register output signal Sot, and outputs a register output signal Soc configuring the control signal Sc to the host CPU 3 via the bus 2.

On the other hand, a register input signal Sic containing a bandwidth control signal Scf described later for controlling a passing bandwidth of a pre-filter bank 18 outputted from the host CPU 3 is subjected to the interface processing in the interface 17. The processed signal is temporarily stored as a register input signal Sit in the host register 12. Then, the host register 12 outputs the bandwidth control signal Scf to the pre-filter bank 18 at a timing described later. The outputted signal is used for controlling the passing bandwidth of the pre-filter bank 18.

In this manner, the pre-filter bank 18 passes information corresponding to the passing bandwidth out of the information contained in the image information Sin, and generates the image filter signal Sv to output it to the encoding circuit 5.

Next, a detailed configuration and operation of the encoding circuit 5 will be described with reference to FIG. 4.

As shown in FIG. 4, the encoding circuit 5 is composed of: an adder 20; a DCT portion 21; a quantizing portion 22; a inverse-quantizing portion 23; a variable length encoding portion 24; a inverse-DCT portion 25; a movement compensation predicting portion 26; a buffer remains detecting portion 27; and a quantization scale setting portion 28.

Next, an operation will be described here.

The adder 20 to which the image filter signal Sv is inputted subtracts a compensation signal Se derived from the movement compensation predicting portion 26 from the image filter signal Sv. Then, the subtracted signal is outputted as a subtractive signal Sa to the DCT portion 21.

Next, the DCT portion 21 provides DCT processing for compression of information quantity to the subtractive signal Sa based on a publicly known art. The processed signal is outputted as a conversion signal Sd to the quantizing portion 22.

The quantizing portion 22 quantifies the conversion signal Sd so as to be compatible with a bit rate indicated by a rate signal Sr described later, generates a quantizing signal Sq to output the signal to the variable length encoding portion 24 and the inverse-quantizing portion 23.

Next, the inverse-quantizing portion 23 provides inverse-quantization processing to the quantizing signal Sq, generates a inverse-quantizing signal Sig to output it to the counter-DCT portion 25.

Then, the inverse-DCT portion 25 provides an inverse-DCT (inverse-discrete cosine conversion) processing to the inverse-quantizing signal Sig based on a publicly known art. The processed signal is outputted as an inverse-conversion signal Sid to the movement prediction compensating portion 26.

Then, the motion compensation predicting portion 26 detects a motion vector per each macro block contained in the described image filter signal Sv from the feature extracting circuit 1, based on the MPEG system per each frame image therein. In addition, the predicting portion 26 performs a compensation processing using so called intra-frame prediction in the MPEG system based on the detected motion vector and inverse-conversion signal Sid. Then, the predicting portion generates the compensation signal Se for compression of an information quantity, and outputs the signal to the adder 20.

On the other hand, the variable length encoding portion 24 provides a variable length encoding processing to the quantizing signal Sq. Then, the encoding portion 24 generates an output signal Sout that is a signal obtained by encoding the original image filter signal Sv to be compressed in accordance with the MPEG system. The encoding portion outputs the signal to the buffer remains detecting portion 27 and to the outside.

At this time, the buffer remains detecting portion 27 predicts and detects the remains of a buffer memory used when the compressed and encoded image information contained in the output signal Sout is reproduced based on the output signal Sout, and generates a remains signal Srm to output the signal to the quantization scale setting portion 28.

In this manner, the quantization scale setting portion 28 uses the intra-frame dispersion value contained in the dispersion value signal Sdr from the feature extracting circuit 1 as a so called activity. The quantization scale setting portion 28 also generates the rate signal Sr for controlling a bit rate in the quantization processing so that information quantity in the output signal Sout as a result of the quantization processing at the quantizing portion 22 is information quantity that does not overflow or underflow the buffer memory based on the remains signal Srm. Then, the setting portion 28 outputs the signal to the quantizing portion 22.

In operation of the described encoding circuit 5, the DCT portion 21, quantizing portion 22, variable length encoding portion 24 and movement compensation predicting portion 26 receive and send the control signal Smpeg from and to the host CPU 3 via the bus 2 respectively. They also optimize an encoding parameter, and perform the compression encoding.

Next, encoding processing containing the fade change detection processing according to the present invention will be described with respect to FIG. 5 and FIG. 6.

FIG. 5 shows processing of the feature extracting circuit 1 in the encoding processing and processing of the host CPU 3 in parallel to each other.

As shown in FIG. 5, in the encoding processing in the embodiment, when the host CPU 3 outputs an encoding start command for starting an encoding processing to each constituent element via the bus 2 (step S1), the feature extracting circuit 1 receiving this command initializes the infra-field average DC level detecting portion 16, intra-field dispersion value detecting portion 19 and host register 12 (step S9).

Next, at the feature extracting circuit 1, the intra-field dispersion value and intra-field average value DC level in a field image (a second field image of a frame image (n−1) shown in FIG. 6) are detected by using the infra-field dispersion value detecting portion 19 and intra-field average DC level detecting portion 16 after initialized (step S10). The field image is a field image inputted as image information Sin immediately before the detection. This processing at the step S10 is executed for a second field image of the above frame image (n−1) at a timing (1) shown in FIG. 6.

When the intra-field dispersion value and intra-field average DC level are detected, the detection result is then written into the host register 12 in the feature extracting circuit 1 (step S11). Thereafter, at a timing (2) shown in FIG. 6, there is outputted the field synchronizing signal Ssy to the host CPU 3 via the bus 2 (step S12). The field synchronizing signal Ssy is a signal that indicates an input timing of a field image (a first field image of a frame image (n) shown in FIG. 6) inputted after a second field image of a frame image (n−1) that is used for detecting the intra-field dispersion value and intra-field average DC level.

Then, it is checked whether or not a control signal Sc for stopping encoding is received from the host CPU 3 (step S13). When the signal is received (step S13: YES), a feature extracting processing is terminated. On the other hand, when the signal is not received, the processing returns to the step S9 in order to continuously execute processing at the steps S9 to S12 for the first field image of the frame image (n) inputted continuously.

After the host CPU 3 has outputted a command for starting encoding at the step S1, it always monitors whether or not the field synchronizing signal Ssy has been outputted from the feature extracting circuit 1 (step S2). When the signal is not outputted (step S2: NO), the CPU 3 waits for such output. On the other hand, when the signal has been outputted (step S2: YES), the CPU 3 reads the intra-field dispersion value and intra-field average DC level recorded in the host register 12 at a timing (3) shown in FIG. 6 (step S3). Then, the contents are stored as a memory signal Sm in the memory 4 (step S4).

In the memory 4, there are already stored the intra-field dispersion value and intra-field average DC level detected and read out relevant to the same field image (that is, the second field image of the frame image (n−2)) that further precedes the second field of the frame image (n−1) shown in FIG. 6.

Next, there is computed a difference between each of the newly detected intra-field dispersion value and intra-field average DC level and intra-field dispersion value and intra-field average DC level stored immediately before the detection (step S5).

Then, the host CPU 3 determines whether or not a change of the intra-field dispersion value and a change of the intra-field average DC level relevant to the three continuous same field images show linearly based on the computed difference and a difference between the intra-field dispersion value and intra-field dispersion DC level computed relevant to the previous same field images (second field image of the frame image (n−2) and second field image of the frame image (n−3)), and stored in the memory 4 (step S6).

With respect to the processing at the step S6, more specifically, assuming that the intra-field dispersion values of the second field images of frame images (n−1), (n−2), and (n−3) are defined as D(n−1 (2)), D(n−2(2)), and D(n−3(2)), respectively, it is determined whether or not the following formula is established.

[Formula 1]

$$D(n-1(2))-D(n-2(2))=D(n-2(2))-D(n-3(2)) \qquad (1)$$

On the other hand, with respect to the intra-frame average DC level, assuming that the intra-frame average DC levels of the second field images of frame images (n−1), (n−2), and (n−3) are defined as DC(n−1(2)), DC(n−2(2)), and DC(n−3(2)), respectively, it is determined whether or not the following formula is established.

[Formula 2]

$$DC(n-1(2))-DC(n-2(2))=DC(n-2(2))-DC(n-3(2)) \qquad (2)$$

In addition, the processing at the steps S4 to S6 is executed at a period (4) shown in FIG. 6.

As a result of the determination at the step S6, when a change of the intra-field field dispersion value and a change of the intra-field average DC level show linearly relevant to the three continuous field images (that is, when the above formulas (1) and (2) are established, or when the determination result is YES at the step S6), it is assumed that the fade change occurs, and the encoding circuit 5 is controlled based on the control signal Smpeg so as to optimize the encoding parameter to encoding of the field image after fade change (step S7). Then, the processing goes to step S8.

This encoding parameter change processing is executed at a boundary timing of frame images coming immediately after the fade change has been detected (timing (5) shown in FIG. 6). At this timing (5), the processing of the step S10 is executed simultaneously for the second field image of the frame image (n) shown in FIG. 6.

On the other hand, as a result of the determination at the step S6, when either the intra-field dispersion value or the intra-field average DC level changes linearly relevant to the three continuous same field images (that is, when either one of the formulas (1) and (2) is not established, or when the result is NO at the step S6), it is assumed that the fade change does not occur so that the encoding parameter must be changed. Then, it is determined whether or not encoding is stopped for any reason, for example, because operation for stopping encoding is executed at an operating portion (not shown) (step S8).

When encoding should be continued (step S8: NO), the processing returns to the step S2 in order to performed the described processing for a next field image to be inputted. On the other hand, when encoding should be stopped (step S8: YES), the corresponding control signal Sc is outputted to the feature extracting circuit 1, and a series of encoding processes is terminated.

The processing at the steps S6 and S7 will be described in more detail. At the step S6, when the intra-field dispersion value has a positive gradient and changes linearly and when the intra-field average DC level has a negative gradient and changes linearly, with respect to the three continuous same fields (step S6: YES), it is determined that the fade change from a field image of a single white color occurs (refer to FIG. 1A). Then, the encoding circuit 5 is controlled so as to optimize the fade change, and a parameter is changed (step S7).

On the other hand, when the intra-field dispersion value and intra-field average DC level each have a positive gradient and changes linearly relevant to the three continuous same field images (step S6: YES), it is determined that the fade change from a field image of a single black color occurs (refer to FIG. 1B). Then, the encoding circuit 5 is controlled so as to optimize the fade change, and an encoding parameter is changed (step S7).

As has been described above, according to fade change detection processing in the encoding processing in the embodiment, the presence or absence of the fade change is detected based on a change of the intra-field dispersion value and intra-field DC level in the continuous field images. Thus, the fade change contained in the image information Sin can be detected precisely.

Therefore, the fade change is detected precisely, and the encoding parameter is changed at a timing that corresponds to the fade change, whereby noise can be reduced, and the image information Sin can be encoded precisely.

In addition, the detected intra-field dispersion value and detected intra-field average DC level both change linearly relevant to the three continuous same field images, it is detected that the fade change occurs in a plurality of the continuous field images. Thus, the fade change can be detected more precisely.

Further, when the detected intra-field dispersion value has a positive gradient and change linearly relevant to the three continuous same field images, and when the detected intra-field average DC level has a negative gradient and changes linearly, it is detected that the fade change from a field image of a single white color occurs in a plurality of the continuous field images. Thus, the fade change from the field image of the single white color can be detected more precisely.

Furthermore, when the detected intra-field dispersion value and detected intra-field DC level each have a positive gradient and change linearly relevant to the three continuous same field images, it is detected that the fade change from a field image of a single black color occurs in a plurality of the continuous field images. Thus, the fade change from the field image of the black color can be detected more precisely.

(III) Modified Embodiment

Next, modified embodiment according to the present invention will be described here.

In the above described embodiments, although there has been provided a configuration in which specific contents of the fade change (that is, type of the fade change from a field image of a white or black color) are determined at the step S6, thereby optimizing an encoding parameter, there can be otherwise provided a configuration in which it is merely detected whether or not the intra-field dispersion value and intra-field average DC level both change linearly at the step S6, whereby only the presence or absence of the fade change is detected, and the encoding parameter is changed accordingly.

In addition, in the above described embodiment and modified embodiment, there has been described a case in which the present invention is applied to detection of the fade change during the encoding processing using the MPEG system. However, according to the present invention, when general image information is inputted (for example, when image information is inputted to a personal computer), in the case whether a so called thumb nail image (a typical frame image that features a series of entire image information) is produced, a frame image containing a field image immediately after the fade change detected according to the present invention can be applied as the thumb nail image.

Further, in the above described embodiment and modified embodiment, the presence or absence of the fade change has been detected by monitoring a change of both of the intra-field dispersion value and intra-field average DC level in each field image. However, either a change of the intra-field dispersion value or a change of the intra-field average DC level is monitored, and it can be determined whether or not the fade change occurs according to whether or not the change is linear. In this case, when the change of the intra-field dispersion value or change of the intra-field average DC level is linear, it is determined that the fade change has occurred.

Furthermore, a program that corresponds to the flow chart shown in FIG. 5 is recorded in an information recording medium such as a flexible disk or a hard disk, and the program is executed after being read out by a personal computer or the like, whereby the personal computer can be used as the host CPU 3.

In the above described embodiments and modified embodiment, there has been described a case in which a so called fade-in of the fade changes is detected. However, in a so called fade-out in which a field image containing any image constituent element is changed to a field image composed of a single color as well, it is found that the intra-field dispersion value and intra-field average DC level changed linearly. Thus, the changes of the intra-field dispersion value and average value DC level are detected, respectively, whereby the generation of the fade-out can be detected so as to optimize the corresponding encoding parameter.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. 2000-102188 filed on Apr. 4, 2000 including the specification, claims, drawings and summary is incorporated herein by reference in its entirety.

What is claimed is:

1. An image change detecting apparatus for detecting generation of a fade change in image information containing a plurality of field images, the image change detecting apparatus comprising:

a dispersion value detecting device for detecting each of intra-field dispersion value in each field image;

an average direct current level detecting device for detecting each of intra-field average direct current levels in each field image; and a detecting device for detecting whether or not the fade change occurs based on a change of the detected intra-field dispersion value and a change of the detected intra-field average direct current level, wherein the intra-field dispersion value is a difference between luminance in each pixel contained in each of at least two field images configuring one frame image and an average value of the luminance in the each of at least two field images.

2. The image change detecting apparatus according to claim 1, wherein the detecting device detects that the fade change occurs in the plurality of the continuous field images when the detected intra-field dispersion value and the detected intra-field average direct current level change linearly relevant to a plurality of the continuous field images.

3. The image change detecting apparatus according to claim 1, wherein the detecting device detects that the fade change from the field images of single white color occurs in the plurality of the continuous field images when the detected intra-field dispersion value has a positive gradient and changes linearly, and when the detected intra-field average direct current level has a negative gradient and changes linearly, relevant to the plurality of the continuous field images.

4. The image change detecting apparatus according to claim 2, wherein the detecting device detects that the fade change from the field images of single white color occurs in the plurality of the continuous field images when the detected intra-field dispersion value has a positive gradient and changes linearly, and when the detected intra-field average direct current level has a negative gradient and changes linearly, relevant to the plurality of the continuous field images.

5. The image change detecting apparatus according to claim 1, wherein the detecting device detects that the fade change from the field images of single black color occurs in the plurality of the continuous field images relevant to the plurality of the continuous field images when the detected intra-field dispersion value and the detected intra-field average direct current level each has a positive gradient and changes linearly.

6. The image change detecting apparatus according to claim 2, wherein the detecting device detects that the fade change from the field images of single black color occurs in the plurality of the continuous field images relevant to the plurality of the continuous field images when the detected intra-field dispersion value and the detected intra-field average direct current level each has a positive gradient and changes linearly.

7. An image encoding apparatus including an image change detecting apparatus for detecting generation of a fade change in image information containing a plurality of field images, the image change detecting apparatus comprising:

a dispersion value detecting device for detecting each of intra-field dispersion value in each field image;

an average direct current level detecting device for detecting each of intra-field average direct current levels in each field image; and a detecting device for detecting whether or not the fade change occurs based on a change of the detected intra-field dispersion value and a change of the detected intra-field average direct current level, the image encoding apparatus further comprising:

an encoding device for changing an encoding parameter in encoding of the detected subsequent image information, thereby encoding the image, when it is detected that the fade change occurs, wherein the intra-field dispersion value is a difference between luminance in each pixel contained in each of at least two field images configuring one frame image and an average value of the luminance in the each of at least two field images.

8. The image encoding apparatus including an image change detecting apparatus for detecting generation of a fade change in image information containing a plurality of field images according to claim 7, wherein the detecting device detects that the fade change occurs in the plurality of the continuous field images when the detected intra-field dispersion value and the detected intra-field average direct current level change linearly relevant to a plurality of the continuous field images.

9. The image encoding apparatus including an image change detecting apparatus for detecting generation of a fade change in image information containing a plurality of field images according to claim 7, wherein the detecting device detects that the fade change from the field images of single white color occurs in the plurality of the continuous field images when the detected intra-field dispersion value has a positive gradient and changes linearly, and when the detected intra-field average direct current level has a negative gradient and changes linearly, relevant to the plurality of the continuous field images.

10. The image encoding apparatus including an image change detecting apparatus for detecting generation of a fade change in image information containing a plurality of field images according to claim 8, wherein the detecting device detects that the fade change from the field images of single white color occurs in the plurality of the continuous field images when the detected intra-field dispersion value has a positive gradient and changes linearly, and when the detected intra-field average direct current level has a negative gradient and changes linearly, relevant to the plurality of the continuous field images.

11. The image encoding apparatus including an image change detecting apparatus for detecting generation of a fade change in image information containing a plurality of field images according to claim 7, wherein the detecting device detects that the fade change from the field images of single black color occurs in the plurality of the continuous field images relevant to the plurality of the continuous field images when the detected intra-field dispersion value and the detected intra-field average direct current level each have a positive gradient and changes linearly.

12. The image encoding apparatus including an image change detecting apparatus for detecting generation of a fade change in image information containing a plurality of field images according to claim 8, wherein the detecting device detects that the fade change from the field images of single black color occurs in the plurality of the continuous field images relevant to the plurality of the continuous field images when the detected intra-field dispersion value and the detected intra-field average direct current level each has a positive gradient and changes linearly.

13. An image change detecting method for detecting an occurrence of a fade change in image information containing a plurality of field images, the image change detecting method comprising the processes of:

detecting each of the intra-field dispersion values in each field image;

detecting each of the intra-field average direct current level in each field image; and detecting an occurrence of the fade change based on a change of the detected intra-field dispersion value and a change of the detected intra-field average direct current level, wherein the intra-field dispersion value is a difference between luminance in each pixel contained in each of at least two field images configuring one frame image and an average value of the luminance in the each of at least two field images.

14. The image change detecting method according to claim 13, wherein the process of detecting each of the intra-field dispersion values detects that the fade change occurs in a plurality of the continuous field images when the detected intra-field dispersion value and the detected intra-field average direct current level change linearly relevant to the plurality of the continuous field images.

15. An information recording medium in which an image change detecting program is readably recorded by a computer included in an image change detecting apparatus for detecting generation of a fade change in image information containing a plurality of field images, the image change detecting program causing the computer to function as:

a dispersion value detecting device for detecting each of the intra-field dispersion values in each field image;

an average direct current level detecting device for detecting each of the intra-field average direct current levels in each field image; and a detecting device for detecting an occurrence of the fade change based on a change of the detected intra-field dispersion value and a change of the detected intra-field average direct current level, wherein the intra-field dispersion value is a difference between luminance in each pixel contained in each of at least two field images configuring one frame image and an average value of the luminance in the each of at least two field images.

16. The information recording medium according to claim 15, wherein the image change detecting program is readably recorded by the computer, the image change detecting program causing the computer to further function as:

the detecting device detects that the fade change occurs in the plurality of continuous field images when the detected intra-field dispersion value and the detected intra-field average direct current level change linearly relevant to a plurality of the continuous field images.

17. The image change detecting apparatus according to claim 1, wherein the intra-field dispersion value has a linear behavior.

18. The image encoding apparatus including an image change detecting apparatus for detecting generation of a fade change in image information containing a plurality of field images according to claim 7, wherein the intra-field dispersion value has a linear behavior.

19. The image change detecting method according to claim 13, wherein the intra-field dispersion value has a linear behavior.

20. The information recording medium according to claim 15, wherein the intra-field dispersion value has a linear behavior.

* * * * *